(12) United States Patent
Foqiang

(10) Patent No.: US 10,237,927 B2
(45) Date of Patent: Mar. 19, 2019

(54) COIL PANEL AND AN INDUCTION COOKER

(71) Applicant: FOSHAN SHUNDE YA IN ELECTRIC APPLIANCE MANUFACTURE CO., LTD, Foshan Guangdong (CN)

(72) Inventor: Ouyang Foqiang, Foshan Guangdong (CN)

(73) Assignee: FOSHAN SHUNDE YA IN ELECTRIC APPLIANCE MANUFACTURE CO., LTD, Foshan (CN)

( * ) Notice: Subject to any disclaimer, the term of this patent is extended or adjusted under 35 U.S.C. 154(b) by 71 days.

(21) Appl. No.: 15/208,003

(22) Filed: Jul. 12, 2016

(65) Prior Publication Data

US 2018/0020509 A1    Jan. 18, 2018

(51) Int. Cl.
    *H05B 6/12*    (2006.01)

(52) U.S. Cl.
    CPC ......... *H05B 6/1263* (2013.01); *H05B 6/1254* (2013.01)

(58) Field of Classification Search
    CPC .................................. H05B 6/362; H05B 6/42
    USPC ........ 219/546, 601, 632, 672, 677, 620–627
    See application file for complete search history.

(56) References Cited

U.S. PATENT DOCUMENTS

| | | | |
|---|---|---|---|
| 2010/0237064 A1* | 9/2010 | Liu ...................... | H05B 6/1209 219/622 |
| 2011/0084058 A1* | 4/2011 | Kim ...................... | H05B 6/1281 219/467.1 |

* cited by examiner

*Primary Examiner* — Phuong Nguyen

(57) ABSTRACT

This contrivance model discloses a coil panel consisting of the body, the base used for sealing the body as well as the magnetic stripe and the magnetic vane located at the base bottom from top to bottom. The magnetic vane is a cyclic structure. This contrivance model also discloses an induction cooker. This contrivance model not only can effectively reduce electromagnetic radiation arising from operation of the induction cooker and the coil panel and improve heat emission efficiency, but also features easy installation and disassembly.

8 Claims, 3 Drawing Sheets

COIL PANEL AND AN INDUCTION COOKER

TECHNICAL FIELD

This contrivance model is used for household appliances technology, especially for a coil panel and an induction cooker.

BACKGROUND TECHNOLOGY

Featuring multipurpose, no open flame, high efficiency, no pollution and easy cleaning, the induction cooker is well received by consumers.

In case the induction cooker works on a metal hearth, the magnetic line of force will move down and heat up the metal hearth, and consequently the metal hearth will be damaged. To solve the above-mentioned problem, the induction cooker is equipped an electromagnetic-shielding component to avoid influences of the magnetic line of force upon the metal hearth.

Meanwhile, the induction cooker has a small volume and a complicated internal structure, and the small inner space often weakens the heat dissipation capability. Whereas the heat dissipation capability has great effects on the stability of internal parts, the electromagnetic-shielding component will make the installing structure more complicated; as a result, the heat dissipation capability will be further affected and the service life of the induction cooker will be shortened.

This contrivance model is intended to provide a simple coil panel which can effectively reduce electromagnetic radiation arising from operation of the induction cooker and the coil panel and improve heat emission efficiency.

This contrivance model is also intended to provide an induction cooker featuring a high heat emission efficiency as well as easy installation and disassembly.

To solve the above-mentioned technical problems, this contrivance model provides a coil panel consisting of the body, the base used for sealing the body as well as the magnetic stripe and the electromagnetic-shielding component located at the base bottom from top to bottom. The electromagnetic-shielding component is a cyclic structure.

For the purpose of improvement of the above-mentioned scheme, the electromagnetic-shielding component comprises at least two disjoint circles electromagnetic-shielding rings.

For the purpose of improvement of the above-mentioned scheme, the electromagnetic-shielding component comprises at least two electromagnetic-shielding rings.

For the purpose of improvement of the above-mentioned scheme, the space between electromagnetic-shielding rings is 10-30 mm.

For the purpose of improvement of the above-mentioned scheme, the coil panel comprises 3-5 electromagnetic-shielding rings.

For the purpose of improvement of the above-mentioned scheme, the base comprises a circular side wall and a support frame located in the circular side wall. The circular side wall and the support frame form an integral structure, the body of the coil panel is located in the upper part of the support frame, the magnetic stripe and the electromagnetic-shielding component are located in the lower part of the support frame.

For the purpose of improvement of the above-mentioned scheme, the magnetic stripe comprises many radially distributed reinforcing ribs along the circular side wall. The reinforcing ribs form a radial structure.

For the purpose of improvement of the above-mentioned scheme, the reinforcing rib is equipped with a groove at the bottom, the magnetic stripe is embedded in the groove.

For the purpose of improvement of the above-mentioned scheme, the reinforcing rib is equipped with a groove at the bottom, the grooves are located on the edge of reinforcing ribs and form a radial structure. The groove is equipped with discontinuous notches. The electromagnetic-shielding component is embedded in the holding tank discontinuous notches.

Accordingly, the contrivance model also provides an induction cooker consisting of shell, coil panel, main board and radiator fan. Coil panel, main board and radiator fan are located in the shell, the coil panel is fixed above the main board.

This contrivance model has the following advantages:

The coil panel of the induction cooker hereunder this contrivance model adopts special design. To be specific, the coil panel is equipped with a magnetic stripe and an electromagnetic-shielding component which can effectively reduce electromagnetic radiation arising from operation of the induction cooker and the coil panel; meanwhile, the body, the base, the magnetic stripe and the electromagnetic-shielding component are interconnected and form an integral structure. The compact structure can not only avoid displacement, but also reduce the volume of the coil panel and the induction cooker and enable easy installation and disassembly.

Moreover, the electromagnetic-shielding component has a special cyclic structure. To be specific, the electromagnetic-shielding component comprises many concentric electromagnetic-shielding rings, many heat dissipation channels are formed between electromagnetic-shielding rings, and hot air will be exhausted from the coil panel through these heat dissipation channels in order to further improve heat emission efficiency.

The base has a unique structure. To be specific, the base comprises a circular side wall and many radially distributed reinforcing ribs along the circular side wall. The reinforcing ribs can not only stabilize the base structure and avoid deformation, but also effectively protect the body of the coil panel and ensure its normal operation; in the meantime, the reinforcing rib is equipped with a groove at the bottom, the magnetic stripe is embedded in the groove and can be fixed easily; flange grooves with discontinuous notches are located on the edge of the reinforcing ribs. The electromagnetic-shielding component is embedded in the discontinuous notches. Thus, the electromagnetic-shielding component and the base can effective reduce the contact area through point contact and thus improve heat emission efficiency.

DESCRIPTION OF ATTACHED DRAWINGS

MODE OF EXECUTION

In order to clarify purposes, technical proposals and advantages of this contrivance model, this contrivance model will be described in detail combined with attached drawings. We hereby declare that nouns of locality of this contrivance model, such as up, down, left, right, front, back, internal and external, which have been used or will be used in this specification should be based on attached drawings of this contrivance model and should have no restrictions on this contrivance model.

Figure 1:
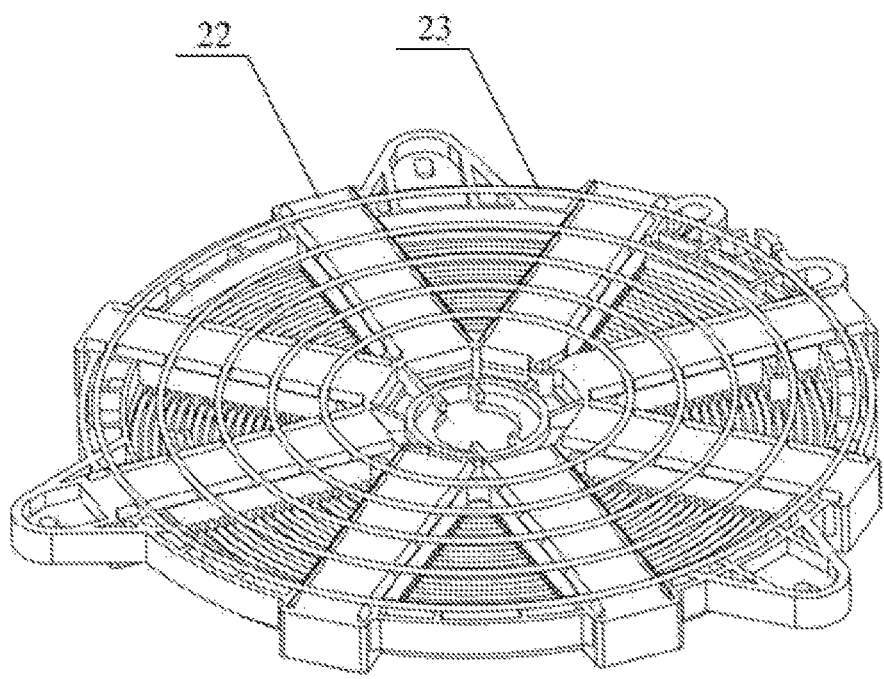
FIG. 1 is the stereoscopic combined chart of the coil panel.
Figure 2:
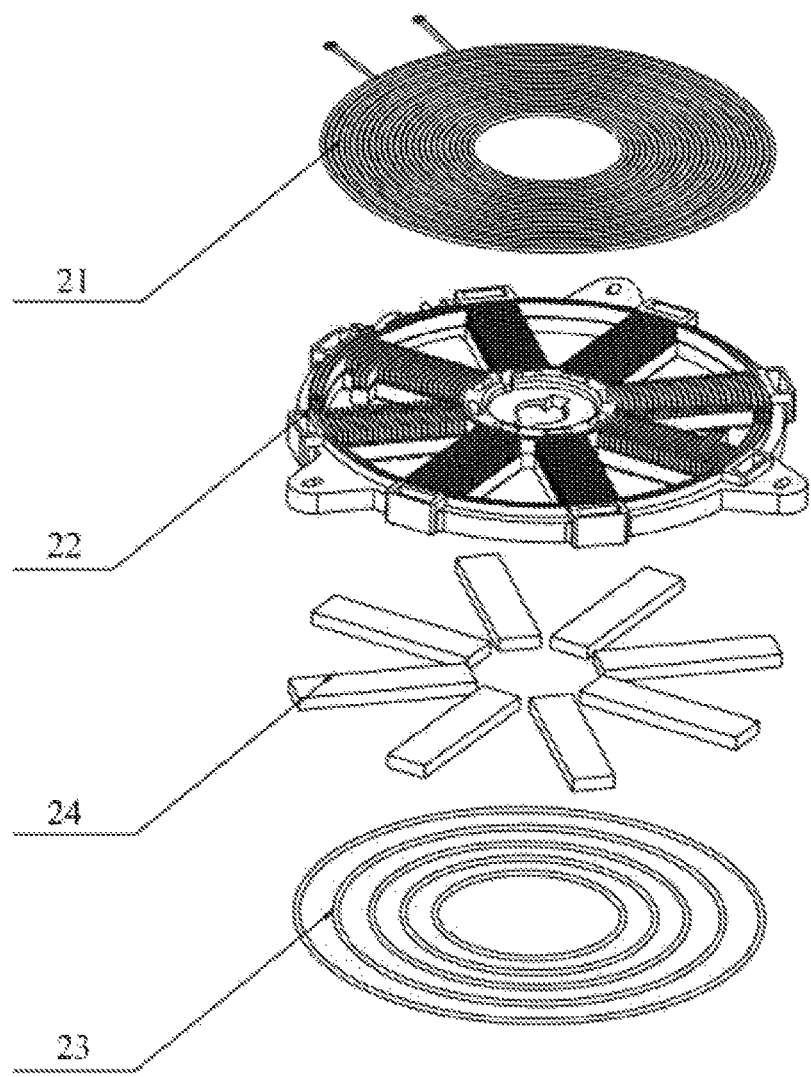
FIG. 2 is the stereoscopic breakdown drawing of the coil panel.
Figure 3:
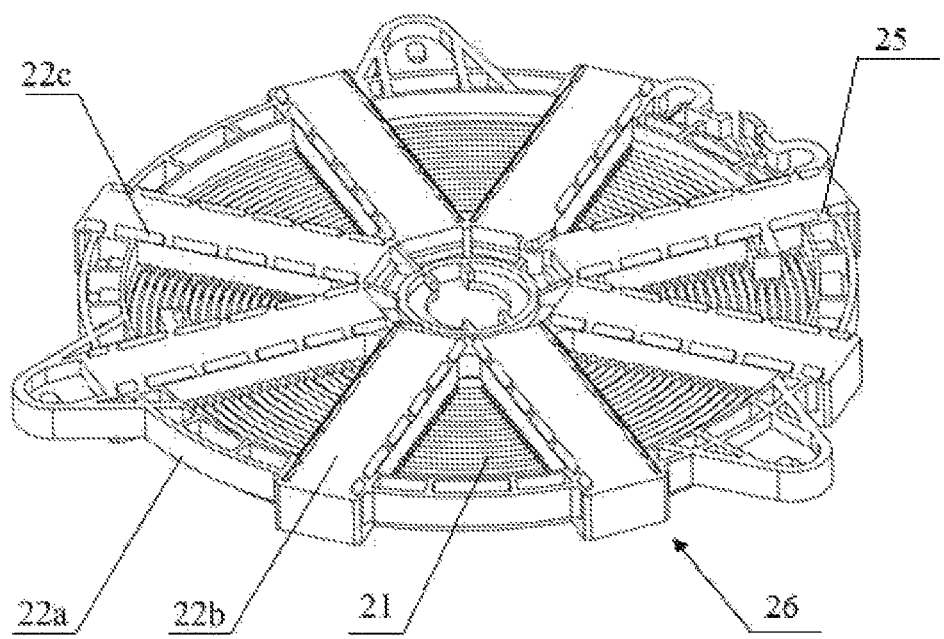
FIG. 3 is the structure diagram of the bottom structure of the coil panel body.

FIG. 1-3 show the concrete structure of the coil panel 2 consisting of the body 21, the base 22 used for the body 21 as well as the magnetic stripe 24 and the electromagnetic-shielding component 23 located at the base bottom from top to bottom. The body 21, the base 22, the magnetic stripe 24 and the electromagnetic-shielding component 23 are interconnected and form an integral structure, the electromagnetic-shielding component 23 is cyclic structure.

Different form existing technologies, the body 21, the base 22, the magnetic stripe 24 and the electromagnetic-shielding component 23 of the coil panel hereunder this contrivance model are interconnected and form an integral structure. The compact structure can not only avoid displacement, but also reduce the volume of the coil panel 2 and enable easy storage. Furthermore, the electromagnetic-shielding component 23 of existing technologies is often a closed disk structure featuring a poor ventilation effect and a poor heat dissipation effect. However, the electromagnetic-shielding component 23 hereunder this contrivance model is a cyclic structure, that is, through holes are located in the middle part of the electromagnetic-shielding component 23, the bottom of the body 21 is unsealed, and hot air can be exhausted from the coil panel through these through holes in order to realize effective heat dissipation.

As shown in FIG. 2, the electromagnetic-shielding component 23 comprises at least two disjoint electromagnetic-shielding rings. To be specific, the electromagnetic-shielding ring is made of aluminum wire or copper wire with a diameter of 1-5 mm, the optimal diameter is 2 mm. In addition, the electromagnetic-shielding ring can be made of tabular aluminum wire or copper wire and then form a sheet circular structure.

It is worth noting that the electromagnetic-shielding component 23 comprises many disjoint electromagnetic-shielding rings, that is, multiple independent heat dissipation channels can be formed between electromagnetic-shielding rings in order to further improve heat emission efficiency. Furthermore, the electromagnetic-shielding component 23 comprises at least two concentric electromagnetic-shielding rings, which can effectively shield the magnetic field. The optimal space between electromagnetic-shielding rings is 10-30 mm, and the coil panel comprises, but is not limited to, 3-5 electromagnetic-shielding rings.

As shown in FIG. 3, the base 22 comprises the circular side wall 22a and a support frame 26 located in the circular side wall 22a. The circular side wall 22a and the support frame 26 form an integral structure, the body 21 is located in the upper part of the support frame 26, the magnetic stripe 24 and the electromagnetic-shielding component 23 are located in the lower part of the support frame 26.

Where, the support frame comprises many reinforcing ribs 22b which are radially distributed along the circular side wall 22a and form a radial structure. The reinforcing ribs can not only stabilize the base structure and avoid deformation, but also effectively protect the body 21 of the coil panel and ensure its normal operation.

Furthermore, the reinforcing rib is equipped with a groove at the bottom, the magnetic stripe 24 is embedded in the groove. The groove is equipped with discontinuous notches 25, the electromagnetic-shielding component is embedded in the discontinuous notches 25.

To be specific, the coil panel comprises, but is not limited to, one or more U-shaped magnetic stripes.

Meanwhile, the groove 22c is located at the bottom and on the edge of the reinforcing rib 22b and form a radial structure. The groove 22c is equipped with discontinuous notches 25. The electromagnetic-shielding component 23 is embedded in the discontinuous notches 25. Thus, the electromagnetic-shielding component 23 and the base 22 can effectively reduce the contact area through point contact and thus improve heat emission efficiency.

As stated above, the body 21, the base 22, the magnetic stripe 24 and the electromagnetic-shielding component 23 of the coil panel 2 hereunder this contrivance model are interconnected and form an integral structure. The compact structure can not only avoid displacement, but also reduce the volume of the coil panel and enable easy storage. Meanwhile, the electromagnetic-shielding component 23 is a special cyclic structure which exhausts hot air from the coil panel and realizes effective heat dissipation. Accordingly, the electromagnetic-shielding component 23 and the base 22 can effectively reduce the contact area through point contact and thus improve heat emission efficiency.

In addition, the electromagnetic-shielding component 23 may not be fixed in the lower part of the support frame, that is, it can be fixed through an individual support and placed in the lower part of the support frame, and form a split structure with the coil panel 2.

Figure 4:
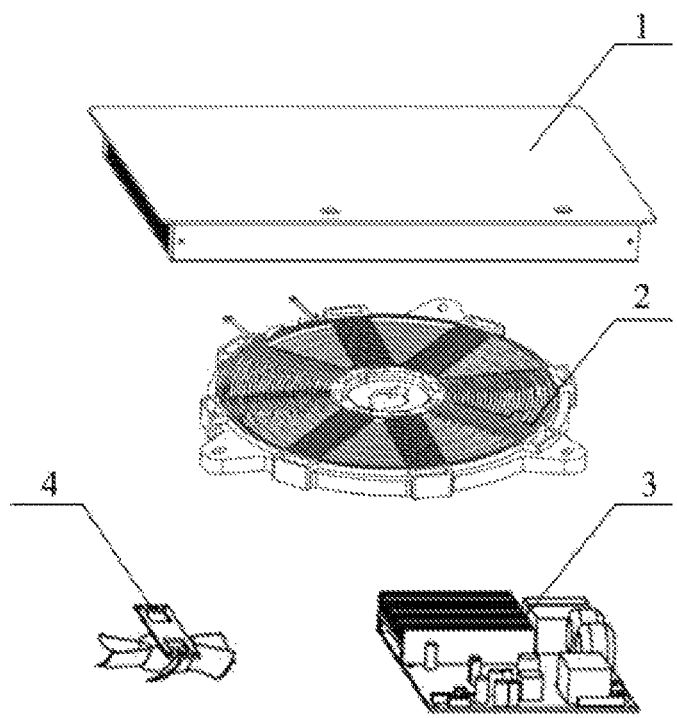
FIG. 4 is the structure diagram of the induction cooker.

FIG. 4 shows the concrete structure of the induction cooker hereunder this contrivance model which comprises shell 1, coil panel 2, main board 3 and radiator fan 4. Shell 1, coil panel 2, main board 3 and radiator fan 4 are located in the shell 1, the coil panel 2 is fixed above the main board 3.

To be specific, the coil panel 2 comprises the body 21, the base 22 used for sealing the body 21 as well as the magnetic stripe 24 and the electromagnetic-shielding component 23 located at the base bottom from top to bottom. The body 21, the base 22, the magnetic stripe 24 and the electromagnetic-shielding component 23 are interconnected and form an integral structure, the electromagnetic-shielding component is a cyclic structure. Where, the electromagnetic-shielding component 23 comprises at lest two concentric electromagnetic-shielding rings, the space between electromagnetic-shielding rings is 10-30 mm, the coil panel comprises, but is not limited to, 3-5 electromagnetic-shielding rings. The base 22 comprises a circular side wall 22a and a support frame located in the circular side wall 22a, the circular side wall 22a and the support frame form an integral structure. The body 21 is located in the upper part of the support frame, the magnetic stripe 24 and the electromagnetic-shielding component 23 are located in the lower part of the support frame. The support frame comprises many radially distributed reinforcing ribs along the circular side wall 22a, the reinforcing ribs 22b form a radial structure. The reinforcing ribs are equipped with a groove at the bottom. The magnetic stripe 24 is embedded in the groove. The coil panel can be equipped with one or more U-shaped magnetic stripes 24. The groove 22c is located at the bottom and on the edge of the reinforcing rib 22b and form a radial structure. The groove 22c is equipped with discontinuous notches 25 the electromagnetic-shielding component is embedded in the discontinuous notches.

It is worth noting that the magnetic line of force will move down and heat up the metal hearth in case that the induction cooker works on a metal hearth, and consequently the metal hearth will be damaged. Thus, the induction cooker is equipped with the magnetic stripe 24 and the electromagnetic-shielding component 23 in order to avoid influences of the magnetic line of force upon the metal hearth when the height of the induction cooker remains unchanged.

Different form existing technologies, the body 21, the base 22, the magnetic stripe 24 and the electromagnetic-shielding component 23 of the coil panel hereunder this contrivance model form an integral structure which features easy installation and disassembly. The electromagnetic-shielding component 23 can effectively reduce electromagnetic radiation arising from operation of the induction cooker and the coil panel; meanwhile, the electromagnetic-shielding component 23 is a cyclic structure, the base 22 and the electromagnetic-shielding component 23 can effectively improve the induction cooker's heat emission efficiency through point contact.

In addition, the electromagnetic-shielding component 23 may not be fixed in the lower part of the support frame, that is, it can be fixed through an individual support and placed in the lower part of the support frame, and form a split structure with coil panel 2.

Aforementioned is the optimal mode of execution of this contrivance model. Ordinary technicians of this field can make improvements and corrections with principles of this contrivance model unchanged, and these improvements and corrections shall be construed as the protection range of this contrivance model.

The invention claimed is:

1. A coil panel comprising:
    a body;
    a base, the base is used for sealing the body;
    an electromagnetic-shielding component, the electromagnetic-shielding component has a cyclic structure; and
    a magnetic stripe, the magnetic stripe is arranged between an underside of the base and the electromagnetic-shielding component;
    the base of the coil panel comprises a circular side wall and a support frame located in the circular side wall, said circular side wall and the support frame form an integral structure;
    the support frame of the coil panel comprising radially distributed reinforcing ribs along the circular side wall, said reinforcing ribs form a radial structure;
    said reinforcing rib of the coil panel is equipped with a groove at the bottom and the magnetic stripe is embedded in the groove; the groove is located on the edge of reinforcing ribs and form a radial structure;
    the groove is equipped with discontinuous notches, the electromagnetic-shielding component is embedded in the discontinuous notches;
    the body, the base, the magnetic stripe and the electromagnetic-shielding component are interconnected and form an integral structure.

2. The coil panel according to claim 1, wherein the electromagnetic-shielding component comprising at least two disjoint electromagnetic-shielding rings.

3. The coil panel according to claim 1, wherein the electromagnetic-shielding component comprises at least two concentric electromagnetic-shielding rings.

4. The coil panel according to claim 3, wherein the coil panel comprises 3-5 electromagnetic-shielding rings.

5. The coil panel according to claim 1, wherein a space between electromagnetic-shielding rings of the coil panel is 10-30 mm.

6. The coil panel according to claim 1, wherein the body of the coil panel is located in the upper part of a support frame and the magnetic stripe and the electromagnetic-shielding component are located in the lower part of the support frame.

7. An induction cooker using the coil panel according to claim 1, said cooker comprising a shell, the coil panel, a main board and a radiator fan, wherein the coil panel, the main board and the radiator fan are located in the shell.

8. The induction cooker according to claim 7, wherein the coil panel is fixed above the main board.

* * * * *